US006863989B1

(12) United States Patent
Dyatlov et al.

(10) Patent No.: US 6,863,989 B1
(45) Date of Patent: Mar. 8, 2005

(54) ADHESIVES COMPRISING LINEAR ISOTACTIC POLYMERS

(75) Inventors: Valery Alexandrovich Dyatlov, Moscow (RU); Bernhard Hanke, Bad Schwalbach (DE); Bernhard Rieger, Ulm (DE); Judith Preuschen, Mainz (DE); Mike Orroth, Richmond (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/089,343

(22) PCT Filed: Oct. 2, 2000

(86) PCT No.: PCT/US00/27137

§ 371 (c)(1),
(2), (4) Date: Mar. 27, 2002

(87) PCT Pub. No.: WO01/27213

PCT Pub. Date: Apr. 19, 2001

(30) Foreign Application Priority Data

Oct. 8, 1999 (EP) .............................................. 99120170

(51) Int. Cl.$^7$ ............................................ C09J 123/12
(52) U.S. Cl. ........................ 428/500; 526/348; 526/351
(58) Field of Search ........................ 428/500; 526/348, 526/351

(56) References Cited

U.S. PATENT DOCUMENTS

| 4,522,982 A | * | 6/1985 | Ewen ........................... 525/240 |
| 5,672,668 A | | 9/1997 | Winter et al. |
| 5,693,836 A | | 12/1997 | Winter et al. |
| 6,028,152 A | | 2/2000 | Winter et al. |
| 6,248,829 B1 | | 6/2001 | Fischer et al. |
| 6,359,095 B1 | | 3/2002 | Winter et al. |

FOREIGN PATENT DOCUMENTS

| EP | 0 707 016 A1 | | 4/1996 |
| WO | WO 95/10575 A1 | | 4/1995 |
| WO | WO 95/25757 | * | 9/1995 |
| WO | WO 96/20225 A2 | | 7/1996 |
| WO | WO 96/26967 | * | 9/1996 |
| WO | WO 96/26967 A1 | | 9/1996 |
| WO | WO 99/20664 A2 | | 4/1999 |
| WO | WO 99/48775 A1 | | 9/1999 |
| WO | WO 99/52950 | | 10/1999 |
| WO | WO 99/52955 A1 | | 10/1999 |

OTHER PUBLICATIONS

Dietrick, et al., "Control of Stereoerror Formation with High–Activity 'Dual–Side' Zirconocene Catalysts: A Novel Strategy To Design the Properties of Thermoplastic Elastic Polypropenes", J. Am. Chem. Soc., Washington, D.C., USA, 1999, vol. 121, pp. 4348–4355.

Rieger, et al., "Novel Metallocene Catalyzed Polypropene Homo– and Brush–Copolymers: Control of New Morphologies and Beyond", Polymeric Materials Science and Engineering, Washington, D.C., USA, Mar. 21, 1999, vol. 80, pp. 51–52.

Gauthier, et al., "Elastomeric Poly(propylene): Influence of Catalyst Structure and Polymerization Conditions on Polymer Structure and Properties", Macromolecules, 1995, 28, pp. 3771–3778, The American Chemical Society.

Chien, et al., "Metallocene Catalysts for Olefin Polymerizations, XXIV, Stereoblock Propylene Polymerization Catalyzed by rac–[anti–Ethylidene(1–$\eta^5$–Tetramethylcyclopentadienyl) 1–$\eta^5$–Indenyl)dimethyltitanium: A Two–State Propagation", Journal of Polymer Science: Part A: Polymer Chemistry, vol. 30, 2601–2617 (1992).

Singh, B., "Elastomeri Homopolymer Polyproylene a Unique Poloyolefin Patiently Wating to Take Off", Conference Proceedings Flexpo 2001, Chemical Market Resources, Inc., pp. 385–390.

* cited by examiner

*Primary Examiner*—Roberto Rabago
(74) *Attorney, Agent, or Firm*—Julie A. McConihay; Angela Marie Stone

(57) ABSTRACT

The present invention relates to adhesives comprising polymeric material wherein the structure of the polymeric material contains elastic amorphous areas of nano scale-size reinforced with self arranged crystalline domains of nanocrystals.

7 Claims, No Drawings

ADHESIVES COMPRISING LINEAR ISOTACTIC POLYMERS

FIELD OF THE INVENTION

The present invention relates to adhesives used for example in assembling articles. Specifically, the present invention relates to elastic adhesives.

BACKGROUND

Adhesives and in particular adhesives comprising olefinic polymers are well known in the art and enjoy widespread usage throughout the industry. Typical areas of application of such adhesive include hygienic articles and in particular disposable absorbent articles, packaging materials, automotive parts, and the like.

Adhesives made from commonly used polyolefins such as PP, PE, PS, PIB have a number of useful properties. They are bio-compatible and food compatible, chemically stabile, inert, non toxic materials. However, most of them have poor mechanical properties including insufficient strength/tear resistance, insufficient stretchability/elasticity and the like.

Other adhesives, such as PU based adhesives, have also been widely used for example because of their elastic properties. PU adhesives however have the disadvantage that they are polymerized from the very toxic monomer isocyanate and hence can not be used for many application due to their inherent toxicity caused by residual monomer content.

Several approaches have been proposed in the prior art to provide elastic properties to such adhesives. The most commonly used approach is based on changing the chemical structure of the polymer by introducing hinged joints/moieties into the main chain of the polymer. These side groups or side chains provide more flexibility to the polymeric backbone preventing crystallization of polymer, lowering the glass transition temperature (Tg) and improving the elasticity of the resulting material. Usually, the hinge groups contain heteroatoms providing flexibility such as oxygen, nitrogen or chlorine placed into the main chain or into bulky side groups. Another approach is mastication of the polymer by blending with special plasticizing agents. Both approaches, however, require heteroatoms to be introduced into the molecule or into the bulk of the coating material.

The third approach proposed in the prior art to provide elastic properties to such adhesives, which is more close to the present invention, is to exploit the formation of hetero-phases which reinforce the bulk material by forming a physical net. To do this the block-co-polymerization of two or more different monomers has been used leading to polymeric backbones comprising blocks with different Tg. This results in micro-phase separation in the bulk with formation of reinforcing crystalline domains of one co-polymer linked with each other by flexible chains of the second co-polymer.

In essence, conventional adhesives carry a wide variety of inherent disadvantages including but not being limited to insufficient strength/tear resistance, insufficient stretchability/elasticity, not being bio-compatible, not being food compatible, comprising heteroatoms such as chlorine and hence leading to toxic residues when burnt, and the like.

It is an object of the present invention to provide adhesives which overcome the disadvantages of the prior art adhesives.

It is an further object of the present invention to provide articles which comprise elastic adhesives.

It is an further object of the present invention to provide a method for manufacturing adhesive of the present invention.

SUMMARY OF THE INVENTION

The present invention provides an article comprising a first element and a second element being joined to said first element by means of an adhesive. The article is characterized in that said adhesive comprises said adhesive comprises a polyolefinic homopolymer having an isotacticity of less than 60% of [mmmm] pentad concentration.

The present invention further provides a method for providing the aforementioned adhesive coating comprising a step of applying an adhesive coating selected from the group of hot melt, spray, powder melt, extruded bead, liquid, solvent based, pressure sensitive, and combinations thereof.

DETAILED DESCRIPTION OF THE INVENTION

The present invention provides an article comprising a first element and a second element being joined to said first element by means of an elastic adhesive comprising a polyolefinic homopolymer.

The term "polyolefinic homopolymer" as used herein refers to those polyolefins which comprise only one phase of molecules all of which exhibiting a similar stereochemical configuration. For example, blends of atactic and isotactic polymers where the two phases have polymerized simultaneously are excluded when this term is used. The term homopolymer includes copolymers where all molecules exhibit a similar stereochemical configuration.

The polyolefinic homopolymer of the present invention may comprise linear isotactic polymers having a structure of one or several $C_3$ to $C_{20}$ olefinic monomers, having an isotacticity of less than 60%, preferably less than 50%, more preferably less than 40%, and most preferably less than 30% of [mmmm] pentad concentration, and having an isotacticity of more 8%, preferably more than 10%, more preferably more than 12%, and most preferably more than 15% of [mmmm] pentad concentration. Preferably, the polyolefinic homopolymer is polypropylene.

The isotacticity of the homopolymers may be reduced compared to the isotactic polypropylenes of the prior art due to a statistic distribution of stereoscopic errors in the polymer chain. The term "stereoscopic error" refers to a stereoscopic sequence characterized by a [mrrm] pentad. In this case, the central monomer has a stereo configuration opposed to the other four monomers in this pentad. The [mrrm] pentad concentration of this polymer therefore is above the statistical probability of $p^2 (1-p)^2$ where p=[m] and hence 1−p=[r] and $p^4$=[mmmm]. Preferably, the pentad concentration is at least $[p (1-p)]^q p (1-p)$ with q being 0.8, more preferably q being 0.6, yet more preferably q being 0.4, yet more preferably q being 0.2, most preferably q being 0.1.

In some embodiments of the homopolymer and in particular in those embodiments where the crystallinity is reduced by means of single stereo errors, a low content of atactic sequences has proven beneficial to the properties of the adhesive of the present invention. Preferably, the [rmrm] pentad concentration is below 6%, more preferably below 5%, yet more preferably below 4%, yet more preferably below 3%, most preferably below 2.5%.

In some embodiments of the homopolymer and in particular in those embodiments where the crystallinity is reduced by means of single stereo errors, a low content of syndiotactic sequences has proven beneficial to the properties of the adhesive of the present invention. Preferably, the [rrrr] pentad concentration is below 6%, more preferably below 5%, yet more preferably below 4%, yet more preferably below 3%, most preferably below 2.5%.

Alternatively, the homopolymer of the present invention may include sequences of atactic and isotactic blocks of polymer.

Preferably, the mean molecular weight $M_w$ of the polymer is above 100000 g/mol, more preferably above 200000 g/mol, yet more preferably above 250000 g/mol, yet more preferably more than 300000 g/mol, most preferably more than 350000 g/mol. Higher molecular weights are particularly beneficial where elastic and tear resistance properties of the adhesive material desired.

For some applications such as adhesion to polymers and mammalian tissue, it is preferred that the molecular weight is below 200000 g/mol, more preferably below 175000 g/mol, most preferably below 150000 g/mol.

The glass temperature $T_g$ is between −50 and +30° C. Preferably the glass temperature is below 10° C., more preferably below 5° C., yet more preferably below 0° C., most preferably below −6° C. The melt temperature of the polymer is obtained after heating the sample 150° C. and subsequently cooling the polymer to −50° C.

Without wishing to be bound by this theory, the polyolefinic polymers exhibit a semi-crystalline structure. The structure contains elastic amorphous areas of nano-scale-size reinforced with self arranged crystalline domains of nano-crystals. The formation of brittle macro-crystalline material from the polymer is achieved by introducing the defects into the polymeric backbone. Isolated monomer units with opposite stereo configuration have been used as the defects, i.e. single stereo errors.

Suitable polymers and a process for manufacturing such polymers are described in PCT patent application EP99/02379 incorporated herein by reference. A catalyst combination suitable for the preparation of such polymers is described in PCT patent application EP99/02378 incorporated herein by reference. Preferably, the process of PCT patent application EP99/02378 is carried out by temperatures of less than 30° C., more preferably less than 25° C., yet more preferably less than 20° C., most preferably less than 15° C. to increase the molecular weight of the resulting polymer. In order to increase the molecular weight, the polymerization is preferably carried out in liquid monomer such as in liquid propene. If it is desired to increase the molecular weight, the catalyst is preferably used in combination with the boron activators mentioned in PCT patent application EP99/02378.

Other suitable polymers and a process for manufacturing such polymers is described in WO99/20664 incorporated herein by reference.

In the prior art, a wide variety of suitable techniques to provide adhesive coatings are known such as applying an adhesive in a form including but not being limited to hot melt, spray, powder melt, extruded bead, liquid, solvent based, pressure sensitive, meltblown fibers and combinations thereof. The aforementioned methods for providing adhesive coatings all have specific advantages which are known to the skilled person. Hence, the skilled person will be able to select a suitable method for providing an adhesive coating of the present invention depending on the specific requirement of the respective application of the adhesive.

The adhesive of the present invention has been found to be able to adhere to polished surfaces such as metal plates, PTFE coated surfaces, polymeric surfaces and the like. The adhesive of the present invention is also suitable for adhering to mammalian tissue such as epidermal tissue.

Preferably, the adhesion force between the two elements of the article of the present invention is adjusted to be at least 5 Newton per centimeter, more preferably at least 10N/cm, yet more preferably 20N/cm, most preferably 40N/cm. Of course, if lower peel forces are desired the adhesive properties such as molecular weight can be changed accordingly. Alternatively, the same peel force requirement apply when surfaces are attached to each other. The peel forces are measured with respect to the specific surfaces they are used on.

The adhesive of the present invention has further been found to only release relative small amounts of odor even in the melt state. In particular, it is possible to manufacture the adhesive of the present invention without the use of solvents and hence, in some embodiments of the present invention, the adhesive does contain solvents.

In some embodiments and in particular in those embodiments having a high molecular weight, the adhesive of the present invention has been found to exhibit increased temperature stability compared to prior art adhesives. This is partly due to the fact that for the adhesives of the present invention a homopolymer is used and is partly due to the high molecular weight of the homopolymer. Preferably, the adhesive material of the present invention has a melting point of at least 100° C., more preferably of at least 110° C., more preferably of at least 120° C., most preferably of at least 130° C. The melt temperature of the polymer is obtained after heating the sample 150° C. and subsequently cooling the polymer to −50° C. If desired, higher melting point may be achieved my blending the homopolymer for example with conventional isotactic polymer such as polypropylene.

Alternatively and in particular in those embodiments in which the adhesive has a relatively low molecular weight, melting point of around 50° C. can be achieved. Such melting point can be used for deactivating the adhesive where this is desired. Heating the adhesive to its melting point will cause the adhesive to flow and hence in can be peeled off at very low peel forces.

The adhesive of the present invention has been found to be stretchable as well as elastic. The stretchability of the adhesive versus its elastic behavior can be adjusted by means of the tacticity of the homopolymer of the present invention. The adhesive material of the present invention has been found to be stretchable without tearing to at least 500% of its original length, more preferably 1000% of its original length, yet more preferably to at least 1500% of its original length, most preferably to at least 2000% of its original length. In addition, the adhesive material of the present invention preferably recovers within 10 minutes after being stretched and held for 1 minute to 500% of its original length back to less than 300% its original length, preferably less than 200% its original length, most preferably less than 150% of its original length. In addition, the adhesive of the present invention has been found to exhibit a low compressive set. The adhesive of the present invention recovers within 10 minutes after a compression to 50% of its original thickness for 1 minute to at least 60% of its original thickness, more preferably at least 70% of its original thickness, yet more preferably to at least 80% of its original thickness, yet more preferably to at least 90% of its original thickness, most preferably to at least 95% of its original thickness. The compressibility of the adhesive of the present invention can be adjusted by increasing the tacticity of the homopolymer or by blending the low tacticity homopolymer with conventional isotactic polymer such as polypropylene.

Without wishing to be bound by this theory, it is believed that the rheological properties of the adhesive of the present invention, i.e. the storage or elastic modulus G' and the viscosity modulus G", are indicative of its creep and its peel/quick stick behavior respectively during use. The G' and G" values at low frequencies (approximately 0.01 rad/s to 1 rad/s) and at high frequencies (100 rad/s to 1000 rad/s) are believed to relate to the behavior of the adhesive at application and at removal respectively. It is well known in the art, to measure G' and G" over a broad range of frequencies, for example a Rheometric Scientific RS-5 rheometer could be used. The measurement of G' and G" should be carried out at the desired usage temperature, i.e. room temperature of 25° C. for most applications or 37° C. for body related applications.

Preferably, the adhesive of the present invention has a viscosity modulus G"(1 rad/s) of less than 30000 Pa, more preferably less than 25000 Pa, yet more preferably less than 20000 Pa, most preferably less than 15000 Pa. Without wishing to be bound by this theory, it is believed that these values of G"(1 rad/s) are indicative of the adhesive not flowing away when the adhesive is applied to the surface.

Preferably, the adhesive of the present invention has a viscosity modulus G"(1 rad/s) of at least 500 Pa, more preferably at least 1000 Pa, yet more preferably at least 1500 Pa, most preferably at least 2000 Pa. Without wishing to be bound by this theory, it is believed that these values of G"(1 rad/s) are indicative of the adhesive being able to conform to the topology of the surface it is applied to.

Preferably, the adhesive of the present invention has a viscosity modulus G"(100 rad/s) of less than 30000 Pa, more preferably less than 20000 Pa, yet more preferably less than 15000 Pa, most preferably less than 10000 Pa. Without wishing to be bound by this theory, it is believed that these values of G"(100 rad/s) are indicative of the adhesive not flowing away upon removal from the surface.

Preferably, the adhesive of the present invention has a viscosity modulus G"(100 rad/s) of at least 1000 Pa, more preferably at least 2000 Pa, yet more preferably at least 3000 Pa, most preferably at least 4000 Pa. Without wishing to be bound by this theory, it is believed that these values of G"(100 rad/s) are indicative of the adhesive not breaking upon removal from the surface.

Preferably, the adhesive of the present invention has a viscosity modulus G'(1 rad/s) of less than 30000 Pa, more preferably less than 25000 Pa, yet more preferably less than 20000 Pa, most preferably less than 15000 Pa. Preferably, the adhesive of the present invention has a viscosity modulus G'(1 rad/s) of at least 500 Pa, more preferably at least 1000 Pa, yet more preferably at least 1500 Pa, most preferably at least 2000 Pa. Without wishing to be bound by this theory, it is believed that these values of G'(1 rad/s) are indicative of the adhesive maintaining its elastic properties when the adhesive is applied to the surface.

Preferably, the adhesive of the present invention has a viscosity modulus G'(100 rad/s) of less than 30000 Pa, more preferably less than 25000 Pa, yet more preferably less than 20000 Pa, most preferably less than 15000 Pa. Preferably, the adhesive of the present invention has a viscosity modulus G'(100 rad/s) of at least 2000 Pa, more preferably at least 3000 Pa, yet more preferably at least 4000 Pa, most preferably at least 5000 Pa. Without wishing to be bound by this theory, it is believed that these values of G'(100 rad/s) are indicative of the adhesive maintaining its elastic properties upon removal from the surface.

Preferably, the ratio of G'(1 rad/s)/G"(1 rad/s) is in the range of 1 to 30. This is believed to be indicative of the flow behavior of the adhesive of the present invention during application of the adhesive to the surface of the substrate.

Of course, if other values of G' and G" are desired, the adhesive properties can be adjusted accordingly within the above given limits.

The adhesive according to the present invention may also be used as a construction element in an article. Such articles include but are not limited to toys, furniture, clothing, shoes, sport equipment, complex constructions such as buildings, cars, household appliances, and the like. Having regard to the specific advantages of the polymers used for the articles of the present invention, it will be readily apparent to the skilled practitioner to apply and to optionally modify the adhesives according to the present invention as construction elements in the above and similar articles.

The adhesives of the present invention are suitable for joining non-sealable polyolefinic surfaces, for joining and adhering to wood surfaces, for joining and adhering to Plexiglas surfaces and the like.

The adhesives are suitable for applications where the adhesive needs to be stretchable, i.e. where the bonded surfaces of the first element and the second element should be allowed to make small movements relative to each other. For example, the adhesive of the present invention may be used as a binder resin for nonwoven web materials. The adhesive of the present invention will allow for further processing of such bonded nonwoven web materials such as for example mechanical activation such as by ring rolling.

The adhesives of the present invention may for example be activated by electromagnetic radiation such as infrared, UV or visible radiation, by ultrasonic wave and the like.

Additives such as those known in the art may be added to the adhesive of the present invention. For example, the addition of talc is suitable for modifying the adhesive properties.

What is claimed is:

1. An article comprising a first element and a second element being joined to said first element by means of an adhesive characterized in that said adhesive comprises a polyolefinic homopolymer having one phase of molecules all of which exhibit a similar stereochemical configuration, an isotacticity of less than 40% and more than 10% of [mmmm] pentad concentration, a [rmrm] pentad concentration below 3%, and a [rrrr] pentad concentration below 6%.

2. An article according to claim 1 wherein said homopolymer has a molecular weight of at least 100,000 g/mol.

3. An article according to claim 1 wherein said adhesive is stretchable.

4. An article according to claim 2 wherein said adhesive is elastically expandable.

5. The article according to claim 1 wherein said homopolymer is polypropylene.

6. An article according to claim 1 wherein said adhesive is deployed as a construction element.

7. A method for providing an adhesive coating comprising a step of applying an adhesive coating selected from the group consisting of hot melt, spray, powder melt, extruded bead, liquid, solvent based, pressure sensitive, and combinations thereof, wherein said adhesive coating comprises a polyolefinic homopolymer having one phase of molecules all of which exhibit a similar stereochemical configuration, an isotacticity of less than 40% and more than 10% of [mmmm] pentad concentration, a [rmrm] pentad concentration below 3%, and a [rrrr] pentad concentration below 6%.

* * * * *